(12) United States Patent
Adan (10) Patent No.: US 6,798,444 B2
(45) Date of Patent: Sep. 28, 2004

(54) TELEVISION-SET ADJUSTING SYSTEM (75) Inventor: Zainuddin Bin Adan, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 497 days.

(21) Appl. No.: 10/001,248

(22) Filed: Oct. 31, 2001

(65) Prior Publication Data

US 2002/0097337 A1 Jul. 25, 2002

(30) Foreign Application Priority Data

Nov. 1, 2000 (JP) ................................. P 2000-334698

(51) Int. Cl.⁷ ...................... H04N 17/00; H04N 17/02
(52) U.S. Cl. ................................. 348/189; 348/184
(58) Field of Search ................................ 348/552, 189, 348/190, 191, 180, 181, 182, 183, 184, 185, 192, 177, 178, 179, 655, 656, 657, 658, 602, 603, 745, 746, 806, 807; H04N 17/00, 17/02

(56) References Cited

U.S. PATENT DOCUMENTS

| | | | |
|---|---|---|---|
| 4,277,797 A | 7/1981 | Dangschat et al. | 358/21 R |
| 4,654,706 A | 3/1987 | Davidson et al. | 358/139 |
| 5,216,504 A | 6/1993 | Webb et al. | 358/139 |
| 5,432,548 A | 7/1995 | Byen et al. | 348/180 |
| 5,644,757 A | 7/1997 | Lee | 395/501 |
| 5,657,078 A | 8/1997 | Saito et al. | 348/180 |
| 5,739,809 A | 4/1998 | McLaughlin et al. | 345/150 |
| 5,926,211 A * | 7/1999 | Nakayabu | 348/190 |
| 5,943,092 A | 8/1999 | Chuang et al. | 348/177 |
| 5,969,756 A * | 10/1999 | Buckley et al. | 348/190 |
| 5,995,162 A | 11/1999 | Fujimori | 348/569 |
| 6,078,301 A | 6/2000 | Arai et al. | 345/10 |

FOREIGN PATENT DOCUMENTS

| | | | |
|---|---|---|---|
| EP | 0 605 571 B1 | 7/1994 | .......... H04N/17/04 |
| EP | 0 955 771 A1 | 11/1999 | ............ H04N/5/44 |
| JP | 8-322070 | 12/1996 | |
| JP | 9-89965 | 4/1997 | |
| WO | WO 96/08811 | 3/1996 | ............ G09G/5/00 |
| WO | WO 98/32277 | 7/1998 | ............ G09G/1/06 |
| WO | WO 98/32279 | 7/1998 | |

OTHER PUBLICATIONS

British Serach Report, dated Apr. 25, 2002, 3 pages.
Abstract for Japanese application No. JP6205449, Publication Date Jul. 22, 1994, 2 pages.
Hungarian Search Report dated Dec. 2, 2002, 2 pages.
French Search Report dated Dec. 20, 2002, 4 pages.

* cited by examiner

Primary Examiner—Michael H. Lee
(74) Attorney, Agent, or Firm—Osha & May L.L.P.

(57) ABSTRACT

In performing a predetermined adjustment of the TV set 12, the computer 11 plays a most active part in the television-set adjusting system. The computer 11 sends adjusting parameters necessary for the adjusting process to the TV-set adjusting instrument 13; the TV-set adjusting instrument 13 performs the adjusting process by using the parameters; and the computer 11 gathers the result of executing the adjusting process, and sets the TV set 12. This feature eliminates a manual work in executing the adjusting process. The adjusting process is executed through the computer processing. As a result, the cost for the adjusting process is reduced and the adjusting process is executed at high speed.

8 Claims, 10 Drawing Sheets

TELEVISION-SET ADJUSTING SYSTEM

BACKGROUND OF THE INVENTION

1. Field of the Invention

The present invention relates to a television-set adjusting system, and more particularly to a television-set adjusting system for setting up a television set by the utilization of a computer.

2. Related Art

A television-set adjusting system disclosed in the Unexamined Japanese Patent Application Publication No. Hei8-322070 is known for this type of television-set (TV-set) adjusting system. In the publication, a signal generator adaptable for multi-channel is provided which outputs a television signal, together with a channel number to be selected, to a signal generator, which inspects and evaluates a device to be adjusted, e.g., a television set. The signal generator includes a television signal generating means for generating a television signal of each of predetermined broadcasting channels, and a channel selecting means for selecting a channel of the adjusted device. The channel selecting means selects a channel in synchronism with the outputting of a television signal of each channel. Alternatively, the television signal generating means generates a television signal associated with a selected channel number output from the channel selecting means. Another type of television-set adjusting system is disclosed in the Unexamined Japanese Patent Application Publication No. Hei9-89965.

Problems to be Solved

In the former television-set adjusting system, it is essential to manufacture an instrument, called a signal generator, which is exclusively used for the TV set adjustment. Accordingly, the TV-set adjusting instrument must be manufactured every type of TV sets to be adjusted. The same thing is true for the television-set adjusting system last mentioned.

SUMMARY OF THE INVENTION

Accordingly, an object of the present invention is to provide a television-set adjusting system in which a general-purpose computer is combined with an TV-set adjusting instrument to execute various TV-set adjustments, and every adjusting process is electronized, to thereby remarkably reduce a time taken for each adjusting process.

Means to Solve the Problems

To achieve the above object, there is provided a television-set adjusting system which comprises: a computer which stores adjusting parameters, which are used for an adjusting process of a TV set connected thereto when the adjusting process is executed, outputs the adjusting parameters and causes it to execute a predetermined adjusting process, gathers the result of the adjusting process execution, and sets up the TV set on the basis of the adjusting process; and a TV-set adjusting instrument which is connected to the computer, receives the adjusting parameters and executes the adjusting process, and outputs the result of the adjusting process execution to the computer.

The thus constructed television-set adjusting system executes various adjusting processes by the utilization of a general-purpose computer and any of various types TV-set adjusting instruments. In the television-set adjusting system, a TV set and a TV-set adjusting instrument are connected to a computer. The computer stores adjusting parameters used for a predetermined adjusting process of the TV set when it is executed. The computer outputs the adjusting parameters to the TV-set adjusting instrument and causes it to execute the adjusting process, gathers the result of executing the adjusting process from the TV-set adjusting instrument, and sets up the TV set based on the process execution result.

A specific construction of the TV-set adjusting instrument and an example of the adjusting process executed by the TV-set adjusting instrument thus constructed are defined in a second television-set adjusting system. In this system, the TV-set adjusting instrument is constructed with an automatic channel selection device, and executes an automatic channel selection process based on receiving channel data output from the computer, and the computer presets the TV set based on the result of channel selection process execution.

In the second television-set adjusting system, the TV-set adjusting instrument is constructed with an automatic channel selection device disposed within the TV set. The automatic channel selection device executes an automatic channel selection process based on receiving channel data output from the computer connected thereto. And the computer presets the TV set based on the result of channel selection process execution.

Another specific construction of the TV-set adjusting instrument and an example of the adjusting process executed by the TV-set adjusting instrument thus constructed are defined in a third television-set adjusting system. In this system, the TV-set adjusting instrument is constructed with a color information analyzing device, and executes a color analyzing process based on color analysis data output from the computer, and the computer executes any of white balance adjustment, a sub-bright adjustment or setting-up process of the TV set on the basis of the process execution result.

In the third television-set adjusting system, the TV-set adjusting instrument is constructed with a color information analyzing device. The color information analyzing device executes a color analyzing process based on color analysis data output from the computer connected thereto. And the computer executes any of white balance adjustment, a sub-bright adjustment or setting-up process of the TV set on the basis of the process execution result.

Yet another specific construction of the TV-set adjusting instrument and an example of the adjusting process executed by the TV-set adjusting instrument thus constructed are defined in a fourth television-set adjusting system. In this system, the TV-set adjusting instrument is constructed with a high frequency voltmeter device, and executes an adjusting process of any of adjusting items, AGC, AFT, setting of a horizontal oscillation frequency or initializing of a memory IC, and the computer sets up the TV set based on the process execution result.

In the fourth television-set adjusting system, the TV-set adjusting instrument is constructed with a high frequency voltmeter device. The high frequency voltmeter device executes an adjusting process of any of adjusting items, AGC, AFT, setting of a horizontal oscillation frequency or initializing of a memory IC. The computer sets up any of AGC, AFT, a horizontal oscillation frequency or initializes a memory IC.

Still another specific construction of the TV-set adjusting instrument and an example of the adjusting process executed by the TV-set adjusting instrument thus constructed are defined in a fifth television-set adjusting system. In the system, the TV-set adjusting instrument is constructed with a factory data setting device, and executes a factory data setting process based on factory data output from the computer, and the computer sets up the factory data of the TV set based on the process execution result.

In the fifth television-set adjusting system, the TV-set adjusting instrument is constructed with a factory data setting device. The factory data setting device executes a factory data setting process based on factory data output from the computer. And the computer sets up the factory data in a a predetermined area of the TV set connected thereto based on the process execution result.

A further specific construction of the TV-set adjusting instrument and an example of the adjusting process executed by the TV-set adjusting instrument thus constructed are defined in a sixth television-set adjusting system. In this system, the TV-set adjusting instrument is constructed with a picture-quality controller adjusting device, and executes a picture quality controller adjusting process based on controller adjusting data output from the computer, and the computer sets up the TV set based on the process execution result.

In the sixth television-set adjusting system, the TV-set adjusting instrument is constructed with a picture-quality controller adjusting device. The picture-quality controller adjusting device executes a picture quality controller adjusting process based on controller adjusting data output from the computer connected thereto. And the computer sets up the TV set based on the process execution result.

An additional specific construction of the TV-set adjusting instrument and an example of the adjusting process executed by the TV-set adjusting instrument thus constructed are defined in a seventh television-set adjusting system. In this system, the TV-set adjusting instrument is constructed with a high voltage protecting circuit inspecting device, and executes a high voltage protecting circuit inspecting process as an adjusting process based on inspecting data as adjusting parameters output from the computer, and the computer sets up a high voltage protecting circuit of the TV set based on the process execution result.

In the seventh television-set adjusting system, the TV-set adjusting instrument is constructed with a high voltage protecting circuit inspecting device. The high voltage protecting circuit inspecting device executes a high voltage protecting circuit inspecting process based on inspecting data output from the computer. And the computer sets up a high voltage protecting circuit of the TV set connected thereto based on the process execution result.

In the TV set, data transfer among the internal devices is usually performed through the IIC bus. The computer for setting such a TV set converts the setting-up data into data that may be transmitted or received through the IIC bus, and then outputs it to the TV set. If required, a data converting board exclusively used for the data conversion may be coupled to the computer, and the data conversion board is connected to the TV set. An eighth television-set adjusting system is provided which depends from any of the first to seventh television-set adjusting systems. In this system, the TV set and the computer are connected to each other through an LPT/ICC bus data converter.

In the eighth television-set adjusting system, the TV set and the computer are connected to each other through an LPT/ICC bus data converter. The LPT port of the computer is connected to the LPT side of the ICC bus data converter. The IIC bus connector of the TV set is connected to the IIC side of the ICC bus data converter. The computer sends data being acceptable for the LPT, and the data is converted, by the ICC bus data converter, into data being acceptable for the IIC, and then is sent to the TV set.

As described above, the present invention succeeds in providing a television-set adjusting system in which a general-purpose computer is combined with an TV-set adjusting instrument to execute various TV-set adjustments, and every adjusting process is electronized, to thereby remarkably reduce a time taken for each adjusting process.

The second television-set adjusting system, which comprises the computer and the TV-set adjusting instrument, presents a specific example of a preferred TV-set adjusting instrument and an example of adjusting process.

Any of the third to seventh television-set adjusting systems, which comprises the computer and the TV-set adjusting instrument, also presents a specific example of a preferred TV-set adjusting instrument and an example of adjusting process.

Further, in the eighth television-set adjusting system, the computer may be connected to the TV set in a simple manner.

DETAILED DESCRIPTION OF THE PREFERRED EMBODIMENTS

The preferred embodiments of the present invention will be described with reference to the accompanying drawings.

Figure 1:
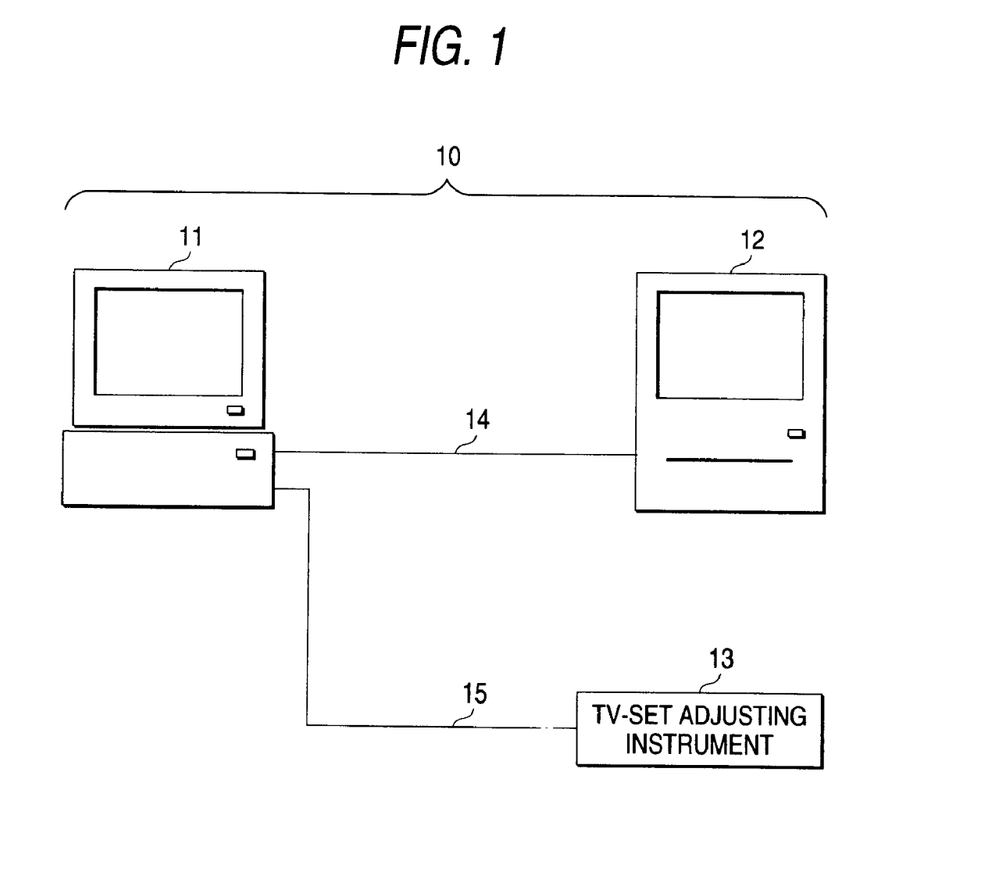
FIG. 1 is a diagram showing correspondence between claims and related components in a television-set adjusting system, which is constructed according to the invention.

FIG. 1 is a diagram showing correspondence between claims and related components in a television-set adjusting system, which is constructed according to the invention. In the figure, a television-set adjusting system 10 is made up of a computer 11, a television (TV) set 12, and a TV-set adjusting instrument 13. As shown, the computer 11 and the TV set 12 are interconnected by a cable 14, and the computer 11 and the TV-set adjusting instrument 13 are interconnected by a cable 15.

The TV-set adjusting instrument 13 sometimes is incorporated, as an internal component, into the TV set 12. In the thus configured television-set adjusting system, when the computer 11 causes the TV-set adjusting instrument 13 to execute a predetermined adjusting process of the TV set 12, it outputs given adjusting parameters to the TV-set adjusting instrument 13 via the cable 15. Upon receipt of the adjusting parameters, the TV-set adjusting instrument 13 executes the adjusting process by using the adjusting parameters.

At this time, the TV set 12 undergoes a control by the computer 11 or a predetermined operation of the TV set 12, which is based on the contents of an adjusting process, and displays a screen containing the adjusting process. The adjusting process is carried out in the TV-set adjusting instrument 13, and the computer 11 gathers the result of the adjusting process execution via the cable 15. The computer 11 outputs the gathered result of the adjusting process execution to the TV set 12 via the cable 14, and sets up the TV set 12 on the basis of the adjusting process execution result.

Thus, in the invention, in performing a predetermined adjustment of the TV set 12, the computer 11 plays a most active part in the television-set adjusting system. The computer 11 sends adjusting parameters necessary for the adjusting process to the TV-set adjusting instrument 13; the TV-set adjusting instrument 13 performs the adjusting process by using the parameters; and the computer 11 gathers the result of executing the adjusting process, and sets the TV set 12. This feature eliminates a manual work in executing the adjusting process. The adjusting process is executed through the computer processing. As a result, the cost for the adjusting process is reduced and the adjusting process is executed at high speed.

Figure 2:
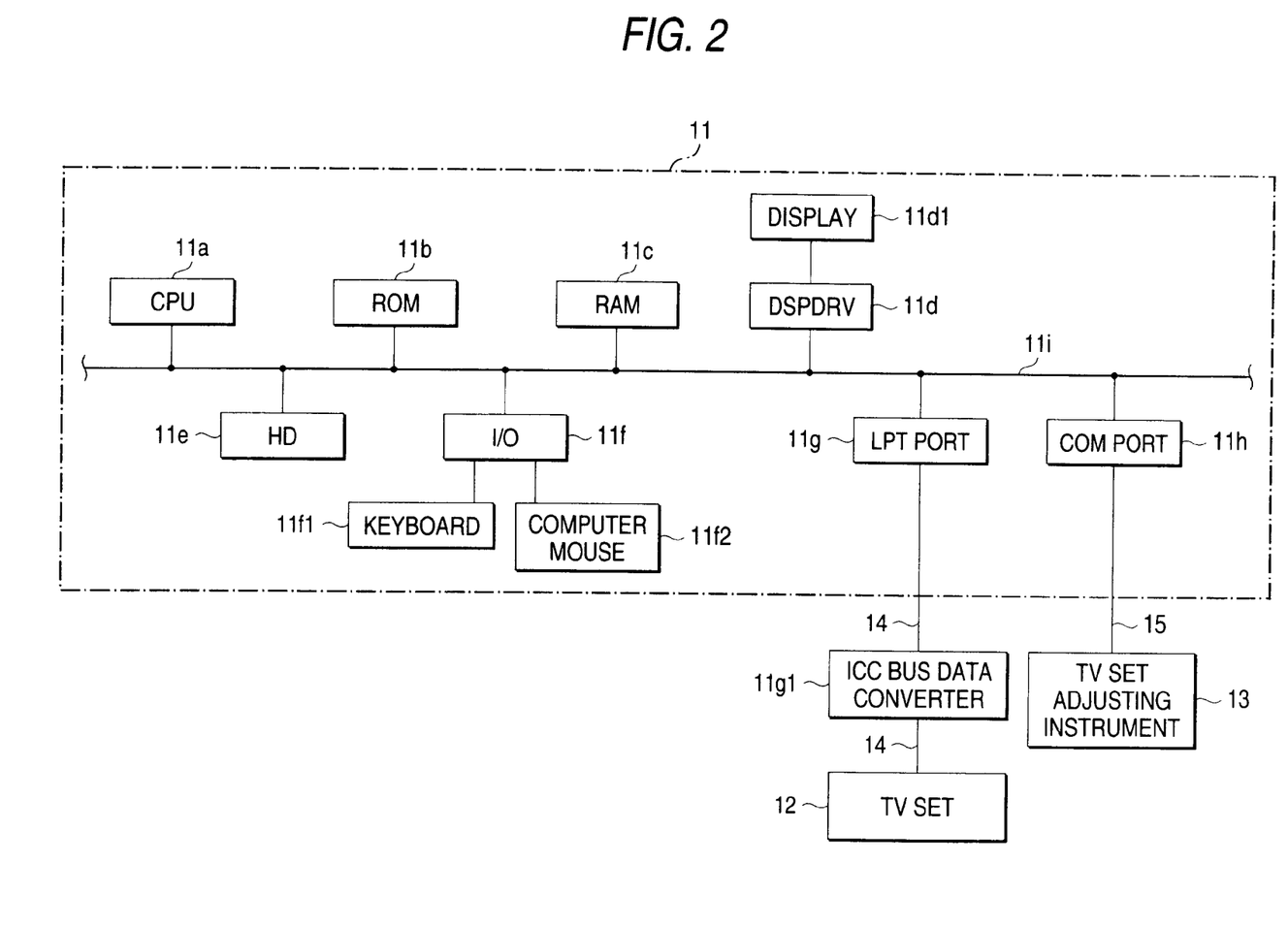
FIG. 2 is a hardware configuration diagram showing an internal configuration of a computer used in the television-set adjusting system.

FIG. 2 is a block diagram showing an internal configuration of the computer 11 used in the television-set adjusting system 10. In the figure, the computer 11 is made up of a CPU 11a, a ROM 11b, a RAM 11c, a display driver 11d, a hard disc 11e, an I/O 11f, an LPT port 11g, and a COM port 11h. Data is transferred among those components via a bus 11i. A display 11d1 as a display means is connected to the display driver 11d. A keyboard 11f and a computer mouse, which are used as input means, is connected to the I/O 11f.

The LPT port 11g is connected to one end of the cable 14 as an interface cable, and the other end of the cable 14 is connected to the TV set 12. A ICC bus data converter 11g1 is inserted between the LPT port 11g and the TV set 12, and carries out a predetermined data conversion process. The cable 15 as an interface cable is connected at one end to the COM port 11h, and at the other end to the TV-set adjusting instrument 13.

In the thus configured hardware, basic programs, such as computing programs and control programs, are stored in the ROM 11b. The CPU 11a executes a basic program. The CPU 11a executes a basic program, while using the RAM 11c as a work area. The hard disc 11e stores application programs, e.g., a TV set adjusting process module, which causes the TV set 12, which is connected through the LPT port 11g to the hard disc, to present a display for the adjusting process, and causes the TV-set adjusting instrument 13, which is connected through the COM port 11h to the hard disc, to execute the adjusting process. The hard disc 11e is also used as a buffer for temporarily storing data representative of the process execution results as read in, and adjusting parameters, and stores programs sequentially updated, and others. The application program is started by the CPU 11a as the need arises. The display driver 11d is further connected to a display 11d1, which displays input states, processing statuses and others by the computer 11, under control of the CPU 11a.

Figure 3:
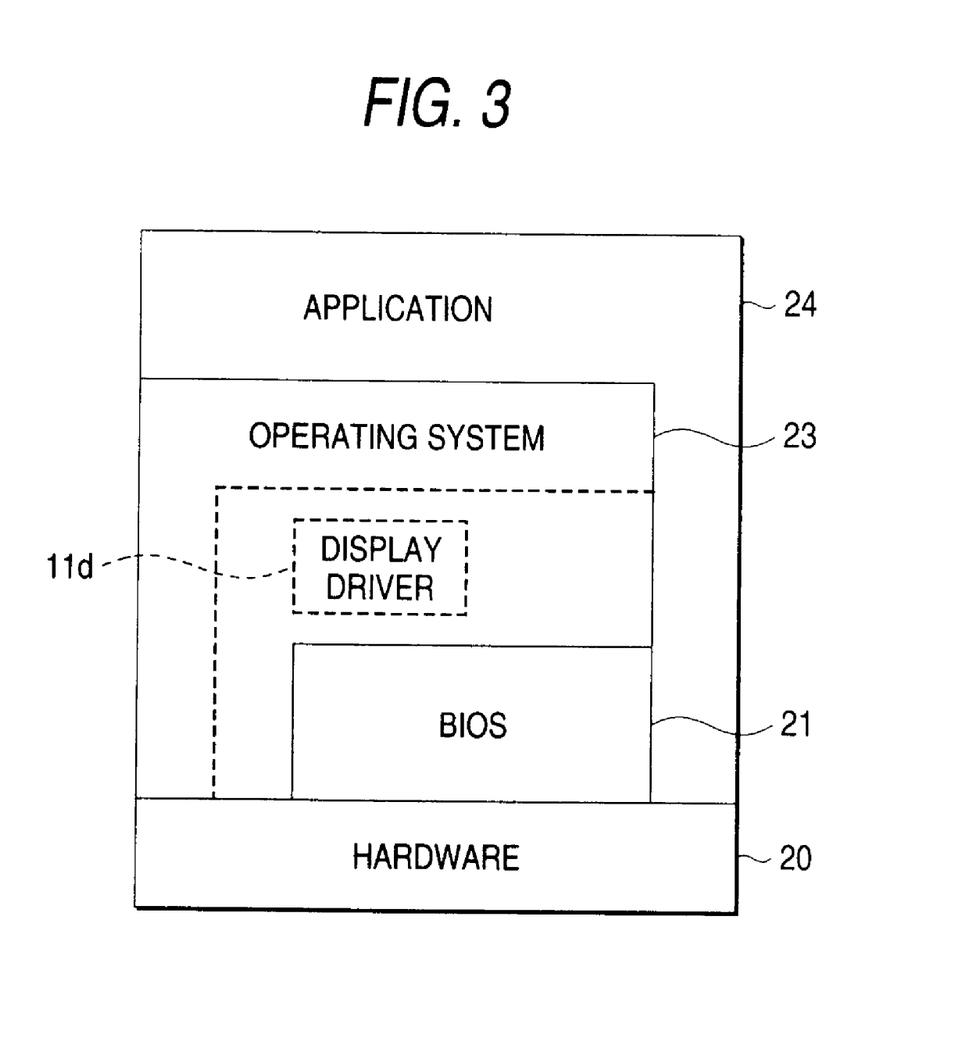
FIG. 3 is a diagram showing various softwares hierarchically stored in a hard disc drive.

The hardware of the computer 11 is configured as described above. Various softwares are stored in the hard disc 11e as layered in FIG. 3 in the computer 11 based on the thus arranged hardware. A BIOS 21 is executed based on the hardware 20 which realizes the various functions as mentioned above, and an operating system 23 and an application 24 are executed in the upper layer thereof. Basically, the operating system 43 accesses the BIOS 42 and then the hardware 20, or directly accesses the hardware 20. The application 24 transfers data to and from the hardware 20 through the operating system 23. In an example of reading data out of the hard disc 11e, it accesses the hardware 20 with the operating system 23.

Figure 4:
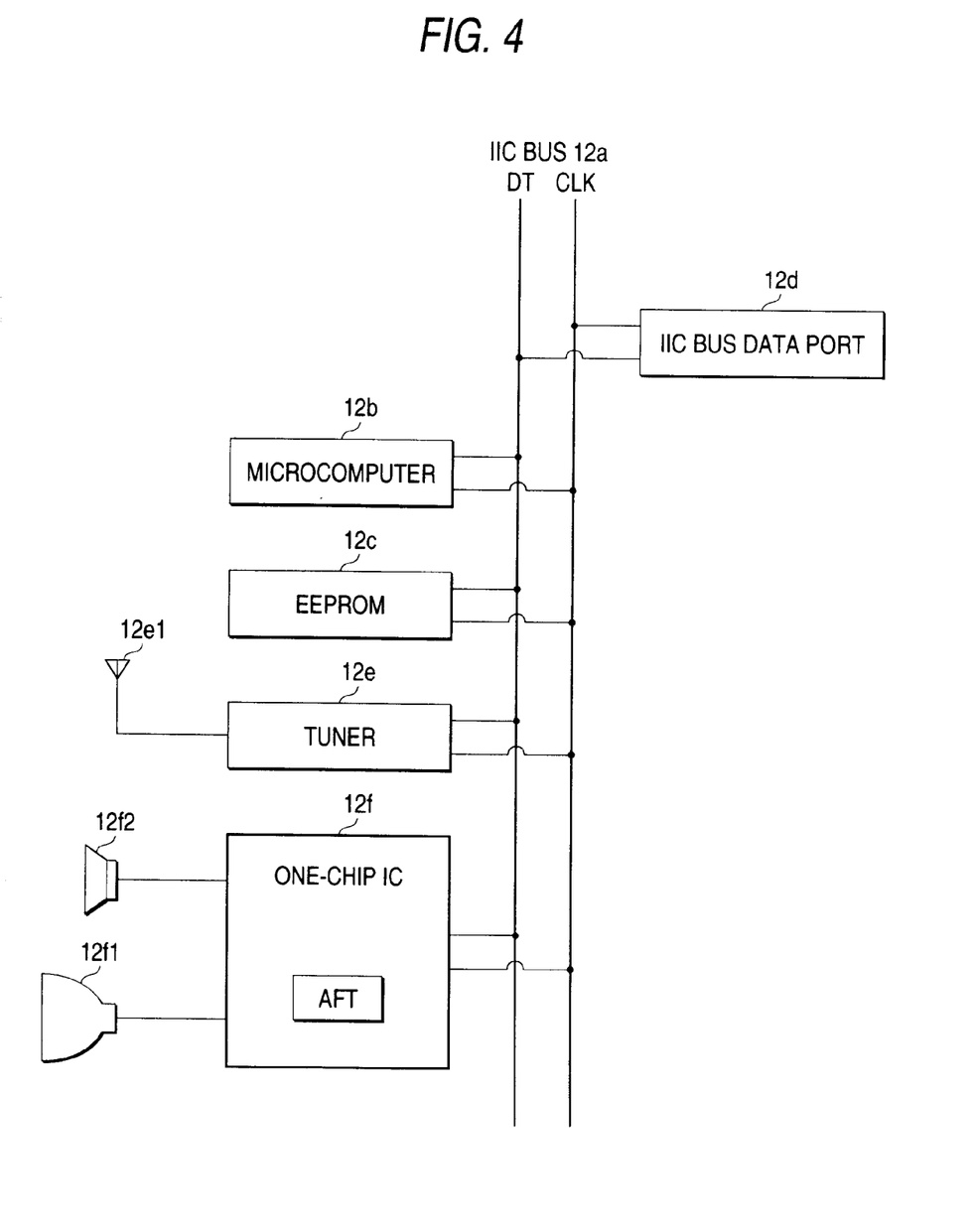
FIG. 4 is a diagram showing a hardware arrangement contained in a TV set 12, which is adjusted by a TV-set adjusting instrument.

FIG. 4 is a diagram showing a hardware arrangement contained in a TV set 12, which is adjusted by a TV-set adjusting instrument. In the figure, an IIC bus 12a of the TV set 12 is connected to various internal devices, such as a microcomputer 12b, an EEPROM 12c, an IIC bus data port 12d, a tuner 12e, and a one-chip IC 12f. Those internal devices 12b to 12f perform predetermined communications through the IIC bus 12a. The EEPROM 12c, the IIC bus data port 12d, the tuner 12e and the one-chip IC 12f exercise predetermined functions based on serial data, which are transferred over a data line DT under control of the microcomputer 12d. In the embodiment, the cable 14 is connected to the IIC bus data port 12d, which is connected through the ICC bus data converter 11g1 to the LPT port 11g of the computer 11.

It functions as a TV set when the microcomputer 12b controls the overall device by a bidirectional communication of the serial data transmission/reception through the IIC bus 12a. The tuner 12e selectively receives a television broadcasting signal of a desired channel by an antenna 12e1 in accordance with a selected channel frequency that is transmitted through the IIC bus 12a from the microcomputer 12b. The tuner 12e, which is connected to the one-chip IC 12f, generates an intermediate frequency from the selectively received television signal, and outputs it to the one-chip IC 12f. The tuner 12e is based on a called voltage synthesizer. It includes a potentiometer for tuning voltage (VO), and a band select switch for selecting any of VHF low band (VL), VHF high band (VH) and UHF (U) band. The tuner selects a television signal of a desired selected channel frequency by appropriately setting them.

The one-chip IC 12f is a one-chip IC containing a signal processing circuit for the intermediate frequency based on the selectively received by the tuner 12e. The one-chip IC 12f contains a video intermediate frequency amplifier, an audio signal processing circuit, a color signal processing circuit, a video signal processing circuit, a deviation signal processing circuit, and the like. The one-chip IC 12f is connected to a television receiver 12f1 and a speaker 12f2. The microcomputer 12b controls the video intermediate frequency amplifier and the like through the IIC bus 12a, and the intermediate frequency signal is demodulated into a video signal and an audio signal under its control. The video signal is visualized by the television receiver 12f1, and the audio signal is output in the form of a sound from a speaker 12f2.

With such an arrangement, a worker starts a television adjusting process module as an application, which is stored in the hard disc 11e, by operating the computer 11. Then, a predetermined adjusting parameter setting screen is visually presented on the display 11d1 on the basis of the television adjusting process module. The worker sets adjusting parameters on the adjusting parameter setting screen. Those adjusting parameters as set are output from the COM port 11h to the TV-set adjusting instrument 13.

Responsively, the TV-set adjusting instrument 13 executes a predetermined adjusting process by using the adjusting parameters. Upon completion of the adjusting process, the computer 11 gathers the process execution result from the TV-set adjusting instrument 13, through the COM port 11h, and stores it into the hard disc 11e. The process execution result is output from the LPT port 11g to the TV set 12, and the TV set 12 is set up on the basis of the process execution result. The process execution result is converted, by the ICC bus data converter 11g1, into data that is acceptable for the IIC bus 12a.

Figure 5:
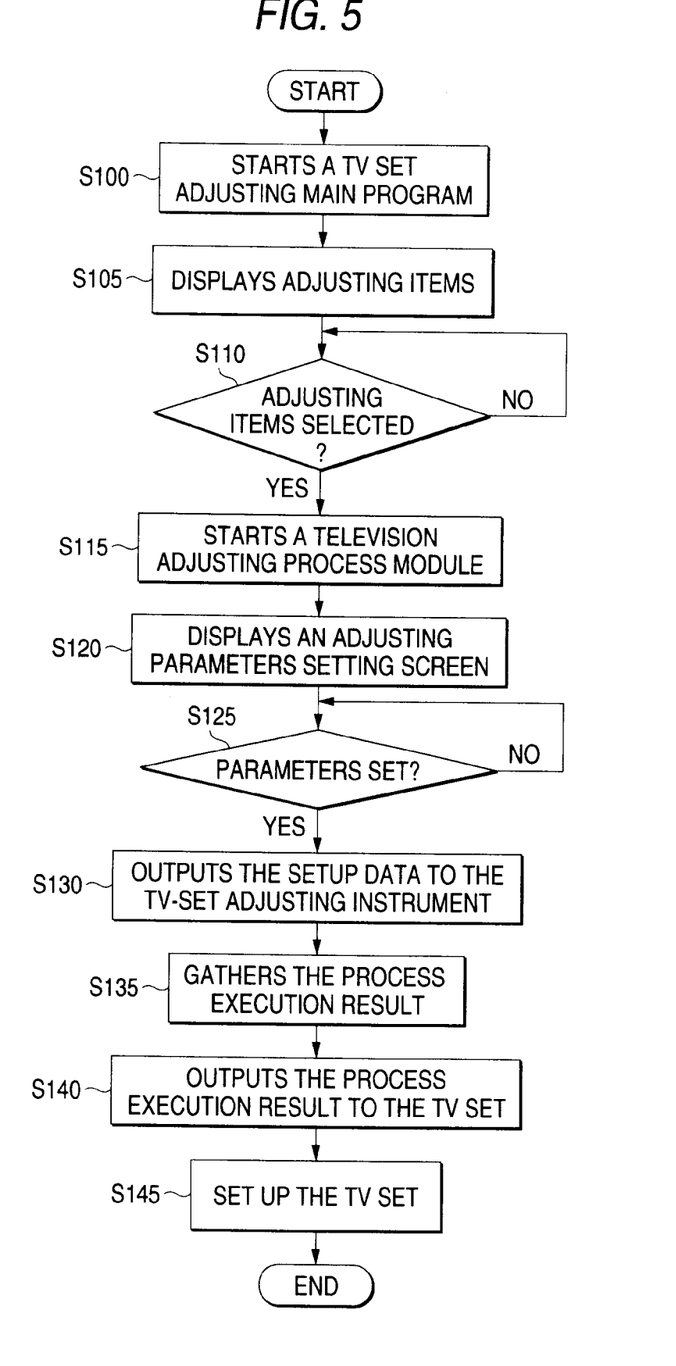
FIG. 5 is a flow chart showing an outline of a TV-set adjusting process.

FIG. 5 is a flow chart showing an outline of a TV-set adjusting process, which is executed by the computer 11 in the thus constructed television-set adjusting system 10. In the figure, a TV set adjusting main program, which is stored in the hard disc 11e, is started in response to an operation by the operation or an adjusting command (Step S100). Upon start of the program, adjustable adjusting items are displayed on the screen of the television receiver 12f1 (Step S105). The worker selects predetermined adjusting items based on the type of the TV-set adjusting instrument 13 connected to the computer 11 (Step S110).

The computer 11 starts a television adjusting process module associated with the selected adjusting items (Step S115), and displays a adjusting parameter setting screen for the adjusting process on the television receiver 12f1 (Step S120). Then, the worker appropriately sets adjusting parameters (Step S125). Upon adjusting parameter setting, the data as set up is output from the computer 11 to the TV-set adjusting instrument 13 (Step S130). The TV-set adjusting instrument 13 executes the adjusting process by using the setup data (Step S135). On the basis of the process execution result, the computer 11, if necessary, executes given internal processing, and outputs the setup data to the TV set 12 (Step S140). The TV set 12 is set up by the set up data (Step S145).

Figure 6:
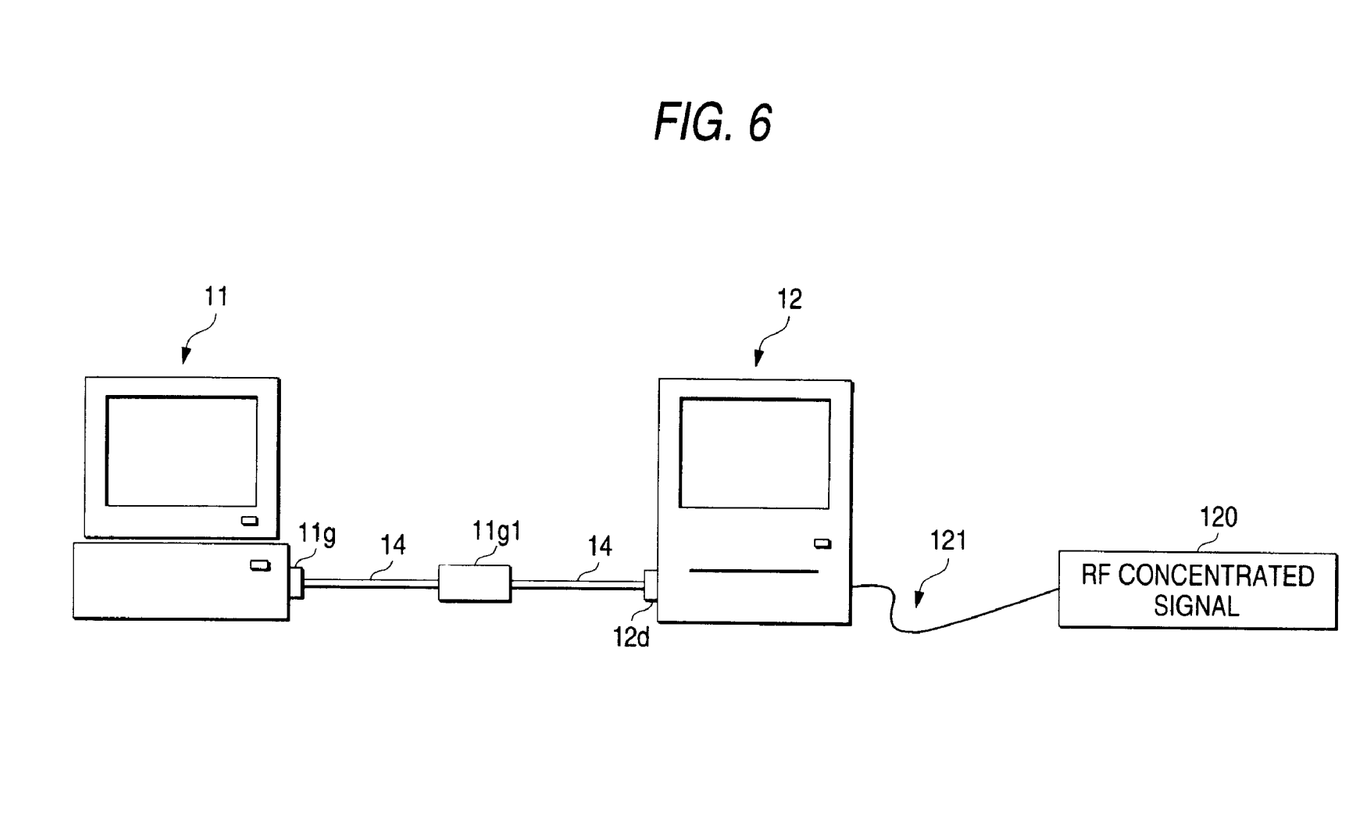
FIG. 6 is a diagram showing a first embodiment to set up a TV set.

A first embodiment to set up the TV set 12 by executing the adjusting process in the arrangement mentioned above, is that the TV-set adjusting instrument 13 is constructed with an automatic channel selection device located within the TV set 12. A hardware arrangement of the television-set adjusting system 10, which is an implementation of this, is shown in FIG. 6.

In the figure, the computer 11 and the TV set 12 are connected by the cable 14 with the ICC bus data converter 11g1 being inserted therebetween. And a receiving channel data setting module as one of the television adjusting process module is started in the computer 11.

After the receiving channel data as adjusting parameters is set up on the setting screen, and then the resultant is output from the LPT port 11g to the ICC bus data converter 11g1. The receiving channel data is converted into data being acceptable for the IIC bus, by the ICC bus data converter 11g1, and the converted one is transferred to the TV set 12. Upon receipt of the receiving channel data, the microcomputer 12b of the TV set 12 receives an RF concentrated signal 120 through an RF cable 121, and executes an automatic channel selecting process. The result of the channel selection is sent to the computer 11, and then is stored into the EEPROM 12c of the TV set 12 under process of the computer 11. In the above step, a called preset is executed in the television-set adjusting system 10. In this way, the TV set 12 executes an automatic channel selecting process under control of the computer 11. Accordingly, the presetting work may be performed at high speed without any manual operation by the worker.

Figure 7:
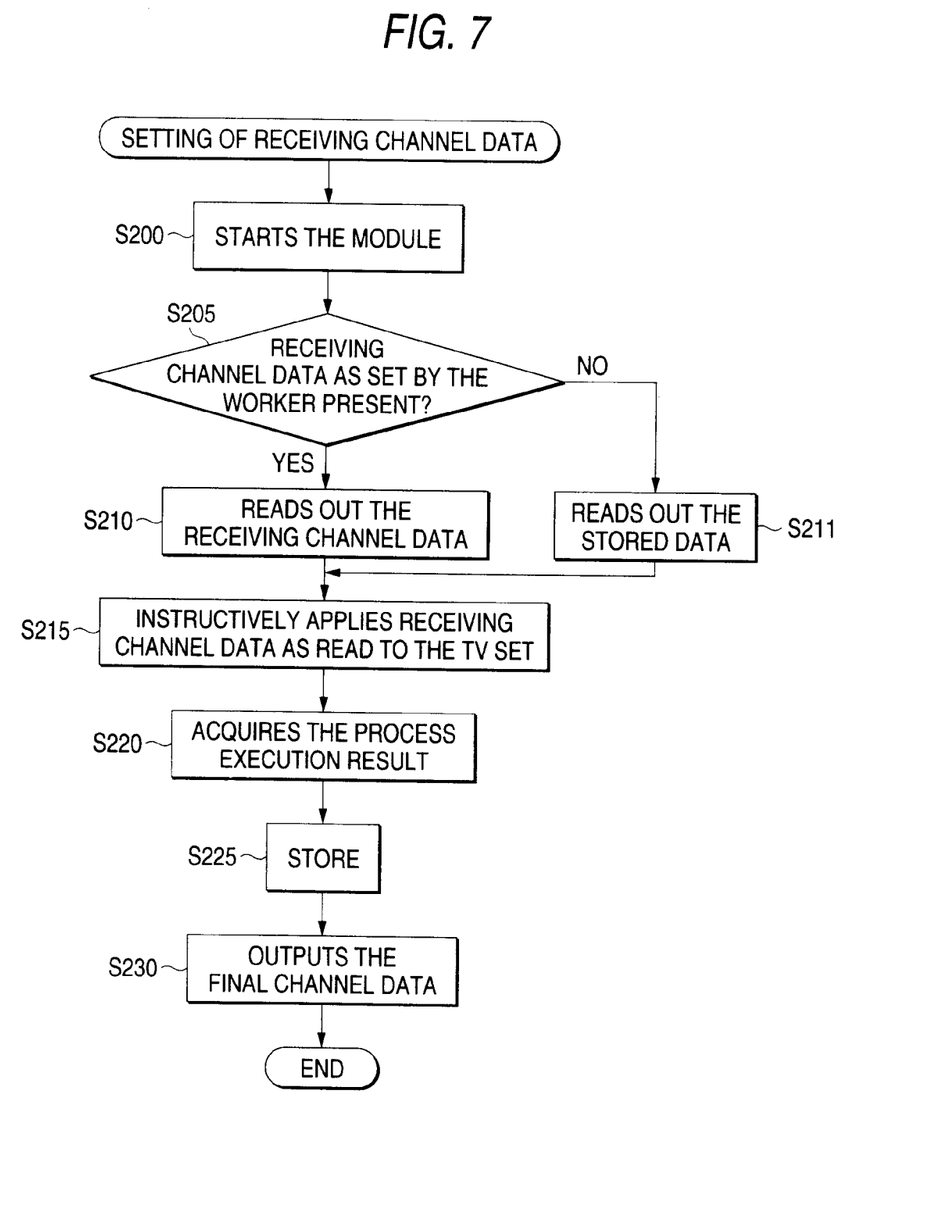
FIG. 7 is a flowchart showing the contents of a receiving channel data setting process, which is executed by the computer.

FIG. 7 is a flow chart showing the contents of a receiving channel data setting process, which is executed by the computer 11. In the figure, a predetermined module is first executed (Step S200). A determination is made as to whether or not receiving channel data as set by the worker is present (Step S205). If the receiving channel data as set by the worker is present, the data as set is read out (Step S210). If it is not set, data prestored in the hard disc 11e is read out (Step S211). The receiving channel data as read is instructively applied to the TV set 12 (Step S215). The computer acquires the result of executing the automatic channel selection process in the TV set 12 in response to the instruction (Step S220), and then is stored into the hard disc 11e (Step S225). Then, it generates final channel data based on the process execution result (Step S230).

Figure 8:
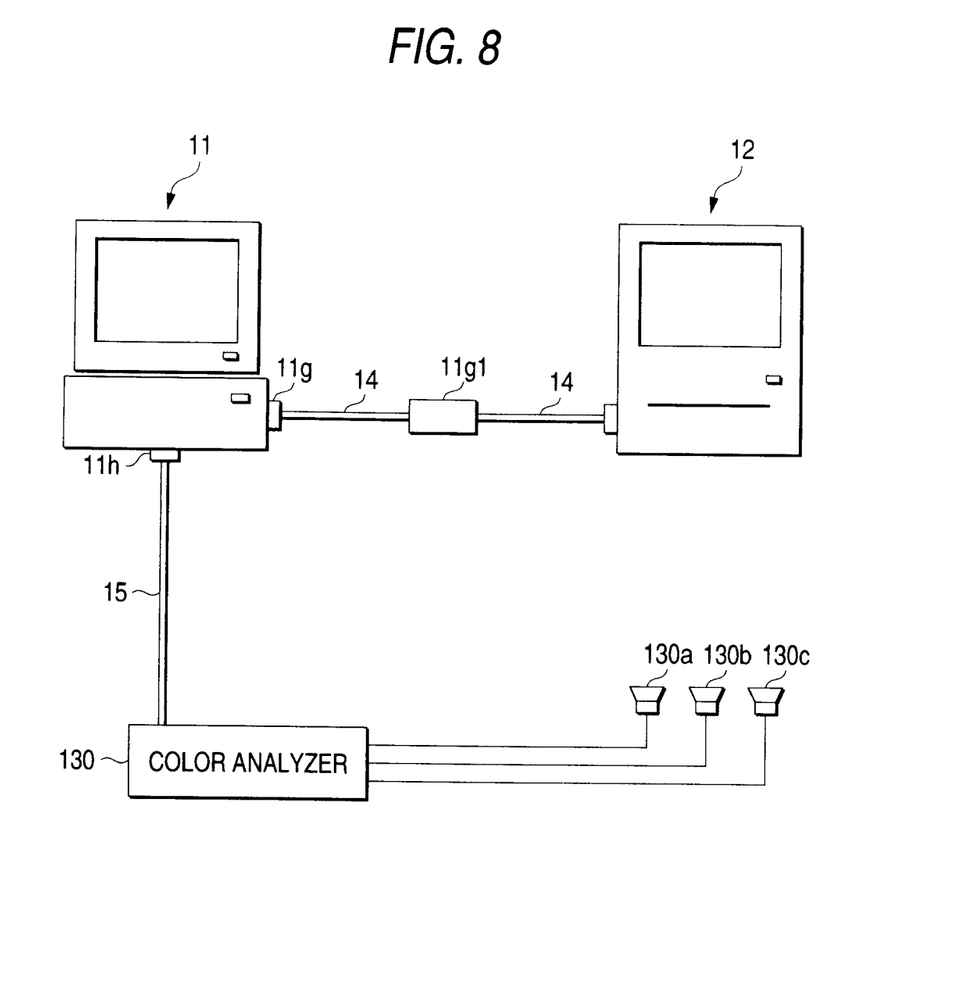
FIG. 8 is a diagram showing a second embodiment to set up a TV set.

In a second embodiment of the adjusting process, the TV-set adjusting instrument 13 is constructed with a color analyzer 130. A system configuration of a television-set adjusting system 10, which is an implementation of this, is shown in FIG. 8. In the figure, the color analyzer 130 as the TV-set adjusting instrument 13 is connected through a cable 15 to the COM port 11h of the computer 11. A [LOW LIGHT] adjusting probe 130a, a [HIGH LIGHT] adjusting probe 130b, and a [VERY LOW LIGHT] adjusting probe 130c are connected to the color analyzer 130. The computer 11 outputs color analysis data to the color analyzer 130, and controls the TV set 12 so that it displays given color bars. And it concurrently executes a white balance adjusting process and a sub-bright adjusting process.

The process execution result is output form the color analyzer 130 to the computer 11, and then the computer 11 outputs the process execution result to the TV set 12, and stores it into the EEPROM 12c. In this way, the white balance and the sub-bright of the TV set 12 are set up. While the white balance adjusting process and sub-bright adjusting process are concurrently executed in the embodiment, one of them may be executed, as a matter of course. The concurrent execution of both the processes accrues to the following merits. A color temperature can be secured highly accurately over a broad brightness range from a dark screen to a highly bright screen without damaging a color temperature deviation on the dark screen.

Figure 9:
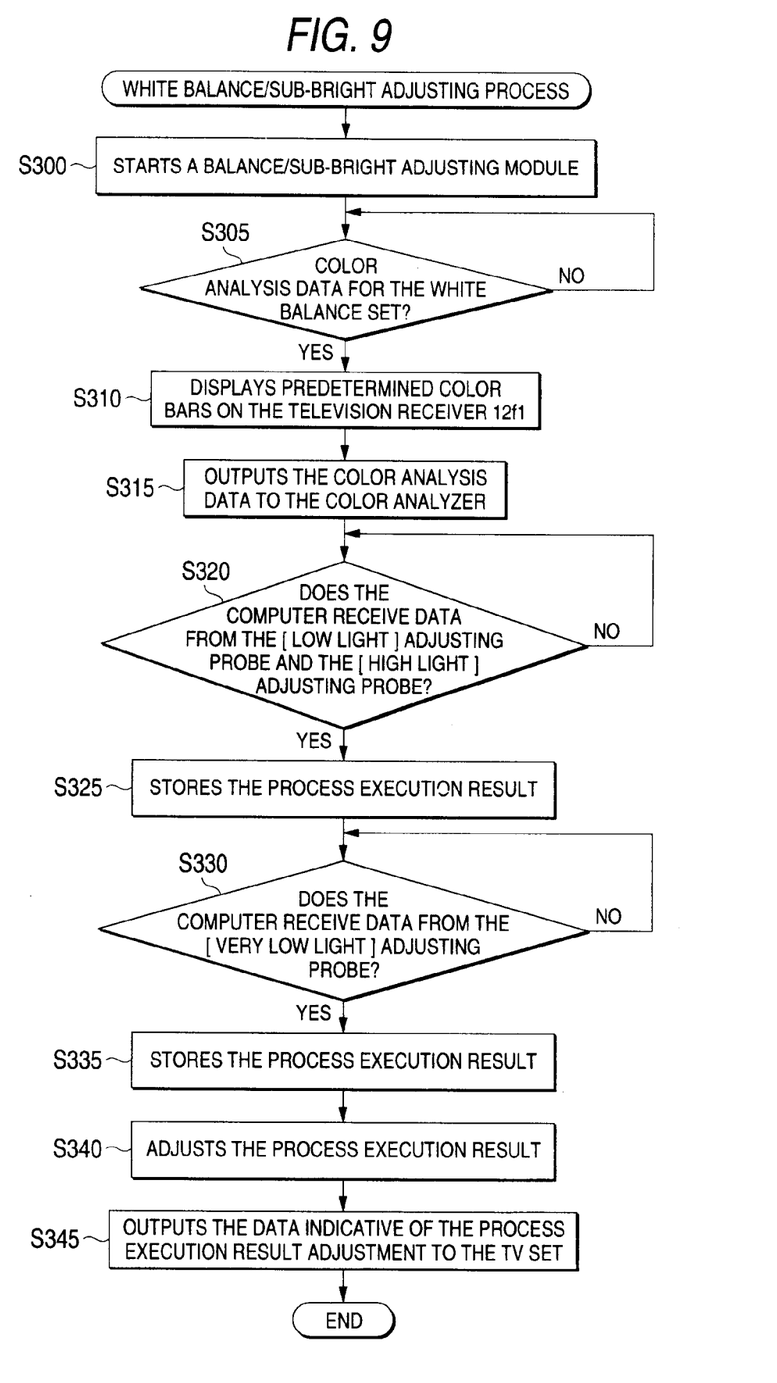
FIG. 9 is a flow chart showing the contents of a white balance/sub-bright adjusting process, which is executed by the computer.

FIG. 9 is a flow chart showing the contents of a white balance/sub-bright adjusting process, which is executed by the computer 11 in the second embodiment. In the figure, a predetermined module is first started (Step S300). A determination is made as to if color analysis data for the white balance adjustment and the sub-bright adjustment is set by the worker (Step S305). If the worker sets the color analysis data, the computer instructs the TV set 12 to display predetermined color bars on the television receiver 12f1 (Step S310). Then, it outputs the color analysis data to the color analyzer 130 (Step S315).

The color analyzer 130 operates the probes 130a to 130c and executes the adjusting process on the basis of the color analysis data. When the adjustment process is executed, the computer 11 first receives, for the white balance adjustment, data that are detected by the [LOW LIGHT] adjusting probe 130a and the [HIGHLIGHT] adjusting probe 130b (Step S320) and stores them (Step S325). Then, for the sub-bright adjustment, it receives data that is detected by the [VERY LOW LIGHT] adjusting probe 130c (process execution result) (Step S330), and stores it (Step S335). Then, the computer executes the process execution result adjustment process of the white balance adjustment data and the sub-bright adjustment data (Step S340), and outputs the data indicative of the process execution result adjustment to the TV set 12, thereby effecting the white balance adjustment and the sub-bright adjustment (Step S345).

Figure 10:
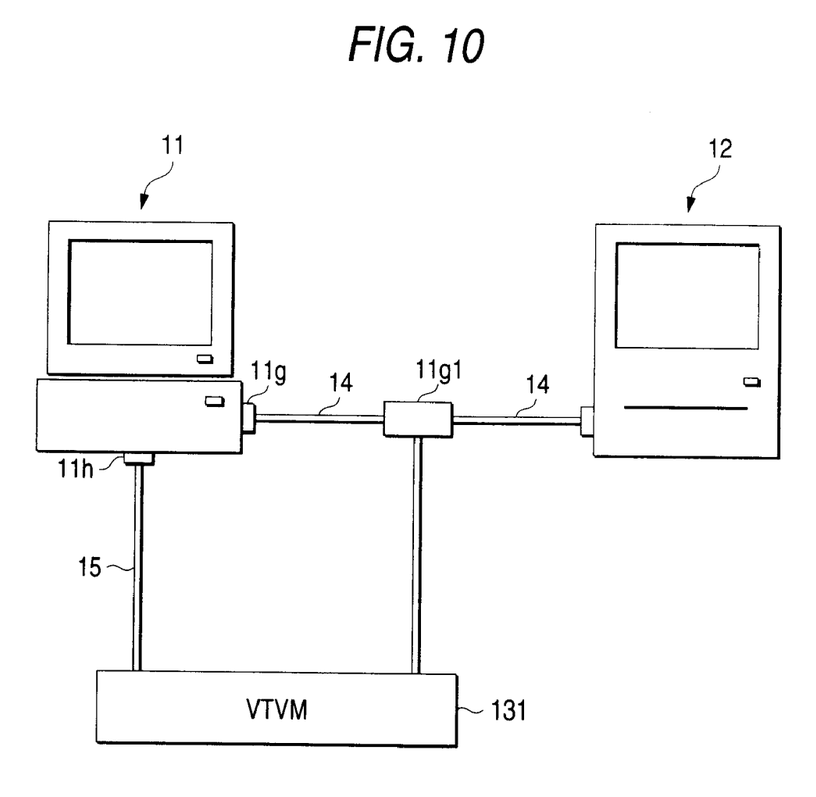
FIG. 10 is a flow chart showing a third embodiment to set up a TV set.

FIG. 10 is a flow chart showing a system arrangement of the television-set adjusting system 10 in which the TV-set adjusting instrument 13 is constructed with a high frequency voltmeter device (VTVM), which the system is used in a third embodiment of the adjusting process.

In the figure, a VTVM 131 as the TV-set adjusting instrument 13 is connected to the COM port 11h of the computer 11 via the cable 15. The computer 11 outputs adjusting parameters to the VTVM 131, and outputs adjusting parameters to the VTVM 131, and adjusting data based on the adjusting parameters is output from the VTVM 131 to the TV set 12. Based on the adjusting data, the TV set 12 executes an adjusting process of any of adjusting items, AGC, AFT, setting of a horizontal oscillation frequency or initializing of a memory IC.

The computer 11 gathers the process execution result, and executes the setting up of the adjusting items of the TV set 12 on the basis of the process execution result. Thus, the respective adjustments and the initializing of the memory IC are automatically executed by the computer 11, without any aid of the worker. This brings about some merits: time taken for the adjusting work is remarkably reduced, and the errors in the work are eliminated.

In an alternative, a picture-quality controller adjusting device may be used for the TV-set adjusting instrument 13 in the television-set adjusting system 10. By so doing, an adjusting process of the picture quality controller in the TV set 12 may be executed by using the computer 11. In another alternative, a high voltage protecting circuit inspecting device for inspecting a high voltage protecting circuit of the TV set 12 may be used for the TV-set adjusting instrument 13. In this alternative, a process of inspecting the high voltage protecting circuit of the TV set 12 may be executed using the computer 11. In a further alternative, a factory data setting device may be used for the TV-set adjusting instrument 13. In the alternative, the work to set the factory data of the TV set 12 may be performed by using the computer 11. Accordingly, the setting work may be done at high speed, with labor saving.

As described above, various adjusting processes are executed by using the computer 11 in the television-set adjusting system 10. Accordingly, those adjusting processes are carried out at high speed. For this reason, when the television-set adjusting system 10 is incorporated into production lines of TV sets 12, which are under control by the computer, for example, when the television-set adjusting system 10 is used for the inspecting process, the inspecting process may be incorporated into an on-line system.

Thus, in the invention, in performing a predetermined adjustment of the TV set 12, the computer 11 plays a most active part in the television-set adjusting system. The computer 11 sends adjusting parameters necessary for the adjusting process to the TV-set adjusting instrument 13; the TV-set adjusting instrument 13 performs the adjusting process by using the parameters; and the computer 11 gathers the result of executing the adjusting process, and sets the TV set 12. This feature eliminates a manual work in executing the adjusting process. The adjusting process is executed through the computer processing. As a result, the cost for the adjusting process is reduced and the adjusting process is executed at high speed.

What is claimed is:

1. A television-set adjusting system comprising:
    a computer which stores adjusting parameters, which are used for an adjusting process of a TV set connected thereto when said adjusting process is executed, outputs the adjusting parameters and causes the adjusting parameters to execute a predetermined adjusting process, gathers the result of said adjusting process execution, and sets up said TV set on the basis of the adjusting process; and
    a TV-set adjusting instrument which is connected to said computer, receives the adjusting parameters and executes the adjusting process, and outputs the result of the adjusting process execution to said computer.

2. The television-set adjusting system according to claim 1, wherein
    said TV-set adjusting instrument includes an automatic channel selection device, and executes an automatic channel selection process as an adjusting process based on receiving channel data as adjusting parameters output from said computer, and
    said computer presets said TV set based on the result of channel selection process execution.

3. The television-set adjusting system according to claim 1, wherein
    said TV-set adjusting instrument includes a color information analyzing device, and executes a color analyzing process based on color analysis data as adjusting parameters output from said computer, and
    said computer executes any of white balance adjustment, a sub-bright adjustment or setting-up process of said TV set on the basis of the process execution result.

4. The television-set adjusting system according to claim 1, wherein
    said TV-set adjusting instrument includes a high frequency voltmeter device, and executes an adjusting process of any of adjusting items, AGC, AFT, setting of a horizontal oscillation frequency or initializing of a memory IC, and
    said computer sets up said TV set based on the process execution result.

5. The television-set adjusting system according to claim 1, wherein
    said TV-set adjusting instrument includes a factory data setting device, and executes a factory data setting process as an adjusting process based on factory data as adjusting parameters output from said computer, and
    said computer sets up the factory data of said TV set based on the process execution result.

6. The television-set adjusting system according to claim 1, wherein
    said TV-set adjusting instrument includes a picture-quality controller adjusting device, and executes a picture quality controller adjusting process as an adjusting process based on controller adjusting data as adjusting parameters output from said computer, and
    said computer sets up said TV set based on the process execution result.

7. The television-set adjusting system according to claim 1, wherein
    said TV-set adjusting instrument includes a high voltage protecting circuit inspecting device, and executes a high voltage protecting circuit inspecting process as an adjusting process based on inspecting data as adjusting parameters output from said computer, and
    said computer sets up a high voltage protecting circuit of said TV set based on the process execution result.

8. The television-set adjusting system according to claim 1, wherein
    said TV set and said computer are connected to each other through an LPT/ICC bus data converter.

* * * * *